United States Patent
You

(10) Patent No.: US 11,889,367 B2
(45) Date of Patent: Jan. 30, 2024

(54) INFORMATION PROCESSING METHOD AND TERMINAL, AND NETWORK DEVICE

(71) Applicant: GUANGDONG OPPO MOBILE TELECOMMUNICATIONS CORP., LTD., Guangdong (CN)

(72) Inventor: Xin You, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 157 days.

(21) Appl. No.: 17/486,553

(22) Filed: Sep. 27, 2021

(65) Prior Publication Data

US 2022/0014988 A1 Jan. 13, 2022

Related U.S. Application Data

(63) Continuation of application No. PCT/CN2019/079936, filed on Mar. 27, 2019.

(51) Int. Cl.
*H04W 36/36* (2009.01)
*H04W 36/00* (2009.01)
(Continued)

(52) U.S. Cl.
CPC ..... *H04W 36/00837* (2018.08); *H04L 5/0051* (2013.01); *H04W 36/30* (2013.01); *H04W 36/362* (2023.05); *H04W 56/001* (2013.01); *H04W 74/04* (2013.01); *H04W 74/0841* (2013.01)

(58) Field of Classification Search
CPC ............ H04L 5/0051; H04W 36/0058; H04W 36/0061; H04W 36/0072; H04W 36/0077; H04W 36/00837; H04W 36/0085; H04W 36/0088; H04W 36/0094; H04W 36/30; H04W 36/304; H04W 36/36; H04W 36/362

See application file for complete search history.

(56) References Cited

U.S. PATENT DOCUMENTS

2019/0053271 A1 2/2019 Islam et al.
2019/0058519 A1 2/2019 Davydov
(Continued)

FOREIGN PATENT DOCUMENTS

CN 104662960 A 5/2015
CN 106954248 A 7/2017
(Continued)

OTHER PUBLICATIONS

Asustek, "Discussion on Random Access Preamble selection for Handover", 3GPP TSG-RAN WG2 Meeting #102 R2-1806919 (May 25, 2018).
(Continued)

*Primary Examiner* — Pao Sinkantarakorn
(74) *Attorney, Agent, or Firm* — PERKINS COIE LLP

(57) ABSTRACT

The embodiments of the present disclosure disclose a method for information processing, a terminal, and a network device. The method includes that: the terminal acquires conditional information, the conditional information being used to determine a target network device to be accessed; and the terminal determines the target network device to be accessed according to the conditional information.

19 Claims, 7 Drawing Sheets

(51) Int. Cl.
*H04L 5/00* (2006.01)
*H04W 36/30* (2009.01)
*H04W 56/00* (2009.01)
*H04W 74/04* (2009.01)
*H04W 74/08* (2009.01)

(56) References Cited

U.S. PATENT DOCUMENTS

| 2021/0076271 A1* | 3/2021 | Jokela | H04W 36/36 |
| 2021/0168678 A1* | 6/2021 | Deenoo | H04W 36/00837 |
| 2021/0377832 A1* | 12/2021 | Wang | H04W 36/0061 |
| 2022/0124590 A1* | 4/2022 | Da Silva | H04W 24/08 |

FOREIGN PATENT DOCUMENTS

| CN | 107005932 A | 8/2017 |
| CN | 109076556 A | 12/2018 |
| CN | 109151923 A | 1/2019 |
| WO | 2018156696 A1 | 8/2018 |
| WO | 2018194326 A1 | 10/2018 |
| WO | 2019032853 A1 | 2/2019 |
| WO | 2019033027 A1 | 2/2019 |

OTHER PUBLICATIONS

Huawei et al., "Remaining details on beam failure recovery" 3GPP TSG RAN WG1 Meeting 91 R1-1719423 (Dec. 1, 2017).
International Search Report in the international application No. PCT/CN2019/079936, dated Dec. 27, 2019.
3GPP "Evolved Universal Terrestrial Radio Access (E-UTRA); Medium Access Control (MAC) protocol specification (Release 15)", 3GPP Standard; Technical Specification; 3GPP TS 36.321, No. V15.4.0, (Jan. 13, 2019), 131 pages.
First Office Action of the Chinese application No. 201980073185.X, dated Apr. 22, 2022. 21 pages with English translation.
Qualcomm Incorporated:"Configuration of power control parameters during handover through CFRA",3GPP Draft; R2-1805209; vol. RAN WG2, No. Sanya, China; Apr. 16, 2018-Apr. 20, 2108 Apr. 14, 2018 (Apr. 14, 2018), XP051428884. 3 pages.
Supplementary European Search Report in European application No. 19921826.4, dated Feb. 17, 2022. 11 pages.
Written Opinion of the International Search Authority in the international application No. PCT/CN2019/079936, dated Dec. 27, 2019. 8 pages with English translation.
Second Office Action of the Chinese application No. 201980073185.X, dated Oct. 27, 2022. 9 pages with English translation.
Third Office Action of the Chinese application No. 201980073185.X, dated Mar. 8, 2023.
Decision of Rejection of the Chinese application No. 201980073185.X, dated Jul. 15, 2023. 24 pages with English translation.

* cited by examiner

INFORMATION PROCESSING METHOD AND TERMINAL, AND NETWORK DEVICE

CROSS REFERENCE TO RELATED APPLICATION

This is a continuation of International Application No. PCT/CN2019/079936, filed on Mar. 27, 2019, and entitled "INFORMATION PROCESSING METHOD, TERMINAL AND NETWORK DEVICE", The disclosure of which is hereby incorporated by reference in its entirety.

TECHNICAL FIELD

The present disclosure relates to the technical field of wireless communications, and in particular to a method for information processing, a terminal and a network device.

BACKGROUND

In some special scenarios, such as a terminal moving at a high speed or high frequency, the terminal needs to perform handover frequently. However, there are many steps in a handover process, and the handover preparation time is long. On the other hand, if the terminal is configured with a Contention-Free Random Access (CFRA) resource for random access, as the handover execution time is unknown, when the terminal actually performs handover, the beam for the terminal varies due to movement of the terminal, which leads to the waste of the CFRA resource.

BRIEF DESCRIPTION OF THE DRAWINGS

The drawings described herein for further understanding of the present disclosure consists a part of the present disclosure. The schematic embodiments and description thereof are used for explaining the present disclosure and do not limit the present disclosure improperly. In the drawings.

DETAILED DESCRIPTION

Description will be made on technical solutions in the embodiments of the present disclosure below in combination with drawings in the embodiments of the present disclosure. It is apparent that the described embodiments are a part of embodiments of the present disclosure and are not all the embodiments. On a basis of the embodiments in the disclosure, all other embodiments obtained by those skilled in the technical field without creative efforts fall into the scope of protection of the disclosure.

The technical solutions of the embodiments of the present disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a 5G system.

Figure 1:
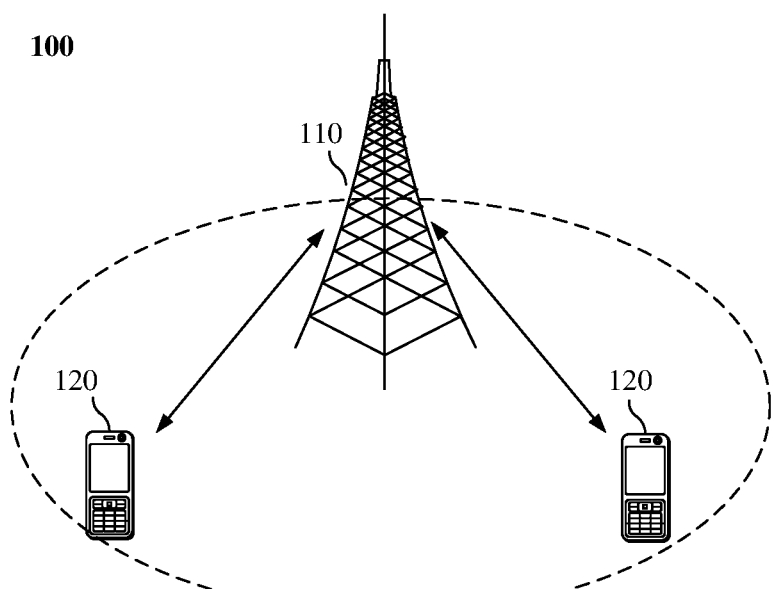
FIG. 1 is a schematic diagram of a communication system architecture according to an embodiment of the present disclosure.

Exemplarily, a communication system 100 that the embodiments of the present disclosure are applied to may be as shown in FIG. 1. The communication system 100 may include a network device 110. The network device 110 may be a device communicating with a terminal device 120 (or called a communication terminal and a terminal). The network device 110 may provide a communication coverage for a specific geographical region and communicate with the terminal device in the coverage. Alternatively, the network device 110 may be a Base Transceiver Station (BTS) in the GSM or the CDMA system, or may be a NodeB (NB) in the WCDMA system, or may be an Evolutional Node B (eNB or eNodeB) in the LTE system or a wireless controller in a Cloud Radio Access Network (CRAN). Alternatively, the network device may be a mobile switching center, a relay station, an access point, a vehicle device, a wearable device, a hub, a switch, a network bridge, a router, a network-side device in a future 5G network, a network device in a future evolved Public Land Mobile Network (PLMN), or the like.

The communication system 100 further includes at least one terminal device 120 within the coverage of the network device 110. As used herein, the "terminal device" includes, but is not limited, to a device configured to receive/send a communication signal through a wired line connection, for example, through Public Switched Telephone Network (PSTN), Digital Subscriber Line (DSL), digital cable and direct cable connections, and/or another data connection/network, and/or through a wireless interface, for example, for a cellular network, a Wireless Local Area Network (WLAN), a digital television network like a Digital Video Broadcasting-Handheld (DVB-H) network, a satellite network, and an Amplitude Modulated (AM)-Frequency Modulated (FM) broadcast transmitter, and/or another piece of terminal device, and/or an Internet of Things (IoT) device. The terminal device configured to communicate through a wireless interface may be called a "wireless communication terminal", a "wireless terminal", or a "mobile terminal." An example of the mobile terminal includes, but is not limited, to a satellite or a cell phone; a Personal Communications' Systems (PCS) terminal capable of combining a cellular radio phone and data processing, fax and data communication ability; a Personal Digital Assistant (PDA) capable of including the radio phone, a pager, Internet/Intranet accessing, a Web browser, a notepad, a calendar and/or a Global Positioning System (GPS) receiver; and a conventional laptop and/or palmtop receiver or another electronic device including a radio telephone transceiver. The terminal device may refer to an accessing terminal, User Equipment (UE), a user unit, a user station, a mobile station, a mobile table, a remote station, a remote terminal, a mobile device, a user terminal, a terminal, a wireless communication device, a user agent or a user apparatus. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in the 5G network, a terminal device in the future evolved PLMN or the like.

Alternatively, the terminal device 120 may perform Device to Device (D2D) communication.

Alternatively, the 5G system or the 5G network may also be called an New Radio (NR) system or an NR network.

A network device and two terminal devices are exemplarily shown in FIG. 1. Alternatively, the communication system 100 may include multiple network devices and another number of terminal devices may be included in coverage of each network device. There are no limits made thereto in the embodiments of the present disclosure.

Alternatively, the communication system 100 may further include another network entity such as a network controller and a mobility management entity. There are no limits made thereto in the embodiments of the present disclosure.

It is to be understood that a device with a communication function in the network/system in the embodiments of the present disclosure may be called a communication device. For example, for the communication system 100 shown in FIG. 1, communication devices may include the network device 110 and terminal device 120 with the communication function, and the network device 110 and the terminal device 120 may be the specific devices mentioned above and will not be elaborated herein. The communication devices may further include other devices in the communication system 100, for example, other network entities like a network controller and a mobility management entity. There are no limits made thereto in the embodiments of the present disclosure.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

The embodiments of the present disclosure provide a method for information processing, a terminal, and a network device.

According to a first aspect, a method for information processing is provided and may include the following operations. A terminal acquires conditional information. The conditional information is used to determine a target network device to be accessed. The terminal determines the target network device to be accessed according to the conditional information.

According to a second aspect, a method for information processing is provided and may include the following operations. A network device sends conditional information to a terminal, and the conditional information is used for the terminal to determine a target network device to be accessed.

According to a third aspect, a terminal is provided and may include an acquisition unit and a determination unit. The acquisition unit is configured to acquire conditional information. The conditional information is used to determine a target network device to be accessed.

The determination unit is configured to determine the target network device to be accessed according to the conditional information.

According to a fourth aspect, a network device is provided and may include a sending unit, configured to send conditional information to a terminal. The conditional information is used for the terminal to determine a target network device to be accessed.

According to a fifth aspect, a terminal is provided and may include a processor and a memory. The memory is configured to store a computer program, and the processor is configured to call and run the computer program stored in the memory to execute the method according to the first aspect.

According to a sixth aspect, a network device is provided and may include a processor and a memory. The memory is configured to store a computer program, and the processor is configured to call and run the computer program stored in the memory to execute the method according to the second aspect.

According to a seventh aspect, a chip is provided and may include a processor, configured to call and run a computer program from a memory, so that a device provided with the chip executes the method according to the first aspect; or, the device provided with the chip executes the method according to the second aspect above.

According to an eighth aspect, a computer-readable storage medium is provided and configured to store a computer program that causes a computer to execute the method according to any one of the first aspect to the second aspect or their respective implementation modes.

According to a ninth aspect, a computer program product is provided and may include a computer program instruction that causes a computer to execute the method according to any one of the first aspect to the second aspect or their respective implementation modes.

According to a tenth aspect, a computer program is provided. When running on a computer, the computer program causes the computer to execute the method according to any one of the first to second aspects or their respective implementation modes.

According to the technical solution of the embodiments of the present disclosure, the conditional information is sent to the terminal through the network device, and the conditional information is used for the terminal to determine the target network device to be accessed. The terminal acquires the conditional information, and the conditional information is used to determine the target network device to be accessed; and the target network device to be accessed is determined according to the conditional information. That is, a to-be-accessed target network device is judged through the conditional information. On one hand, the probability of successful handover is increased, and on the other hand, it may indicate whether the target network device is configured with a CFRA resource in the conditional information, so as to avoid the waste of the CFRA resource.

Figure 2:
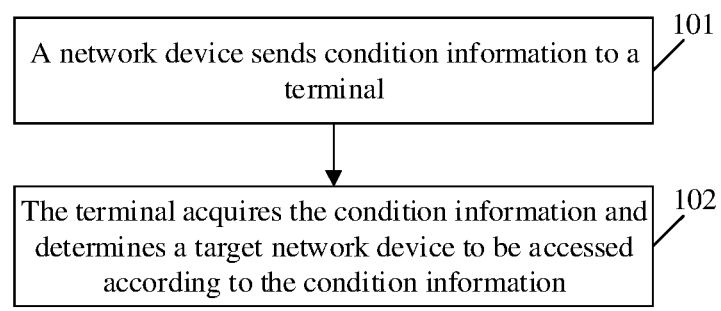
FIG. 2 is a flowchart of a method for information processing according to an embodiment of the present disclosure.

An embodiment of the present disclosure provides a method for information processing. FIG. 2 is a flowchart of a method for information processing according to an embodiment of the present disclosure. As shown in FIG. 2, the method may include the following operations.

In S101, a network device sends conditional information to a terminal, and the conditional information is used for the terminal to determine a target network device to be accessed.

In S102, the terminal acquires the conditional information, and the target network device to be accessed is determined according to the conditional information.

In the present embodiment, the conditional information may include conditional information related to communication quality. The communication quality is represented by at least one of the following information: Reference Signal Received Power (RSRP), Reference Signal Received Quality (RSRQ), or signal to interference plus Noise Ratio (SINR).

In an alternative embodiment of the present disclosure, the conditional information includes first-type conditional information corresponding to a cell and/or second-type conditional information corresponding to a beam.

As an implementation mode, the first-type conditional information corresponding to the cell may include a third threshold corresponding to the communication quality of the cell. In practical application, if it is detected that the communication quality of a certain cell satisfies the third threshold, it may be determined that the cell satisfies the first-type conditional information.

For different ways of representing the communication quality, the third threshold has different values. For example, if the first-type conditional information corresponding to the cell is represented by the RSRP, the first-type conditional information corresponding to the cell may be a third threshold corresponding to the RSRP. In practice, if it is detected that the RSRP corresponding to a certain cell exceeds the third threshold, it may be determined that the cell satisfies the first-type conditional information. For another example, if the first-type conditional information corresponding to a cell is represented by the RSRQ, the first-type conditional information corresponding to the cell may be a third threshold corresponding to the RSRQ. In practice, if it is detected that the RSRQ corresponding to a certain cell exceeds the third threshold, it may be determined that the cell satisfies the first-type conditional information. For yet another example, if the first-type conditional information corresponding to a cell is represented by the SINR, the first-type conditional information corresponding to the cell may be a third threshold corresponding to the SINR. Then, in a practical application, if it is detected that the SINR corresponding to a certain cell is less than the third threshold, it may be determined that the cell satisfies the first-type conditional information.

Of course, the communication quality in the present embodiment may be represented in at least one of the above three ways, and accordingly, the corresponding third threshold may be at least one third threshold corresponding to the configured representation.

In the present embodiment, the second-type conditional information corresponding to the beam may be represented by corresponding conditional information corresponding to a Synchronization Signal Block (SSB) and/or a Channel Status Indicator Reference Signal (CSI-RS). It is to be understood that the communication quality of the beam may be reflected by the communication quality of the SSB and/or the CSI-RS.

As an embodiment, the second-type conditional information includes at least one of a first threshold, a second threshold, or index information. The first threshold corresponds to the communication quality of the SSB and/or the CSI-RS; the second threshold corresponds to the number of the SSB and/or the CSI-RS; and the index information corresponds to the SSB and/or the CSI-RS.

In the implementation mode, if the second-type conditional information is the first threshold corresponding to the communication quality of the SSB and/or the CSI-RS, it may be determined that the beam of the cell satisfies the second-type conditional information if it is detected that the communication quality of the SSB and/or the CSI-RS corresponding to a certain cell satisfies the first threshold.

For different ways of representing the communication quality, the first threshold has different values. For example, if the communication quality in the second-type conditional information corresponding to the beam is represented by the RSRP, the first threshold corresponding to the communication quality of the SSB and/or CSI-RS may be the first threshold corresponding to the RSRP of the SSB and/or the CSI-RS. In practice, if it is detected that the RSRP of the SSB and/or CSI-RS corresponding to a certain beam in a certain cell exceeds the first threshold, it may be determined that the beam corresponding to the SSB and/or CSI-RS satisfies the second-type conditional information. For another example, if the communication quality in the second-type conditional information corresponding to the beam is represented by RSRQ, the first threshold corresponding to the communication quality of the SSB and/or CSI-RS may be the first threshold corresponding to the RSRQ of the SSB and/or the CSI-RS. In practice, if it is detected that the RSRQ of the SSB and/or the CSI-RS corresponding to a certain beam in a certain cell exceeds the first threshold, it may be determined that the beam corresponding to the SSB and/or CSI-RS satisfies the second-type conditional information. For yet another example, if the communication quality in the second-type conditional information corresponding to the beam is represented by the SINR, the first threshold corresponding to the communication quality of the SSB and/or the CSI-RS may be the first threshold corresponding to the SINR of the SSB and/or the CSI-RS. In practice, if it is detected that the SINR of the SSB and/or the CSI-RS corresponding to a certain beam in a certain cell is less than the first threshold, it may be determined that the beam corresponding to the SSB and/or the CSI-RS satisfies the second-type conditional information.

The number of the SSBs and/or the CSI-RSs represents the number of the SSBs and/or the CSI-RSs of which communication quality satisfies the first threshold.

The index information corresponding to the SSB and/or the CSI-RS represents that the communication quality of the SSB and/or the CSI-RS satisfies the first threshold, and the SSB and/or the CSI-RS is configured with the CFRA resource, which is used for CFRA.

In an alternative embodiment of the present disclosure, the operation that the terminal acquires the conditional information may include an operation that the terminal receives the conditional information configured for a network device. It is to be understood that the conditional information is configured by the network device for the terminal.

In an alternative embodiment of the present disclosure, the operation that the terminal acquires the conditional information configured for the network device may include an operation that the terminal receives a Handover Command (HO Command) sent by the network device. The HO Command may include the conditional information.

Correspondingly, the operation that the network device sends the conditional information to the terminal may include an operation that the network device sends the HO Command to the terminal. The HO Command may include the conditional information.

In the present embodiment, the HO Command includes the conditional information. It is to be understood that in an example, the network device transmits the conditional information to the terminal via the HO Command during preparation for the terminal to perform the handover.

In the present embodiment, the operation that the terminal receives the conditional information configured by the network device may include an operation that the terminal receives the conditional information configured by a source network device or an operation that the terminal receives the conditional information configured by a target network device. It may be understood that the network device is the source network device or the target network device corresponding to the terminal. For example, the source network device is a source base station corresponding to the terminal, and the target network device is a target base station corresponding to the terminal.

In an alternative embodiment of the present disclosure, the operation that the terminal determines the target network device to be accessed according to the conditional information may include the operations that the terminal determines one or more network devices according to the conditional information, and the terminal determines the target network device from the one or more network devices.

In the present embodiment, as an implementation mode, the number of conditions included in the conditional information may be at least one, and the one or more network devices determined by the terminal according to the conditional information may be network devices satisfying any of at least one condition. Alternately, the one or more network devices determined by the terminal according to the conditional information may be network devices satisfying all conditions in the conditional information.

As another implementation mode, the conditional information may include the first-type conditional information and the second-type conditional information, which may respectively include at least one condition, so the one or more network devices determined by the terminal according to the conditional information may be network devices satisfying the first-type conditional information and the second-type conditional information. However, the first-type conditional information being satisfied may be determined by satisfying at least one condition in the first-type conditional information, and correspondingly, the second-type conditional information being satisfied may be determined by satisfying at least one condition in the second-type conditional information. For example, the second-type conditional information may include three conditions, i.e., the first threshold corresponding to the communication quality of the SSB and/or the CSI-RS, the second threshold corresponding to the number of the SSBs and/or the CSI-RSs, and the index information corresponding to the SSB and/or the CSI-RS. It may be determined that the second-type conditional information is satisfied so long as any one of the above three conditions is satisfied.

In the present embodiment, the terminal may determine one or more network devices that can be accessed according to the conditional information. If the terminal determines that the number of the network devices that can be accessed is one according to the conditional information, the terminal may directly take the network device as the target network device. If the terminal determines that the number of the network devices that can be accessed is multiple (i.e., at least two) according to the conditional information, the terminal needs to select the target network device from the multiple network devices according to configuration information related to the conditional information, and the selected target network device may be a network device with the best communication quality, or a network device with good communication quality and configured with the CFRA resource. The configuration information related to the conditional information may be configured by the network device (such as a source network device or the target network device). As an example, the terminal receives the HO Command configured by the network device, and the HO Command may include the conditional information and the configuration information related to the conditional information. As another example, the configuration information related to the conditional information may also be sent to the terminal through other signaling. As yet another example, the terminal may also acquire the configuration information related to the conditional information in a pre-agreed manner.

As an implementation mode, the operation that the terminal determines the target network device from the one or more network devices may include the operations that the terminal determines first conditional information, the priority of the first conditional information being higher than that of other conditional information except the first conditional information in the conditional information; and the terminal determines the target network device from the multiple network devices based on the first conditional information.

In the present embodiment, the configuration information related to the conditional information is used to represent the priority information of each condition in the conditional information.

As an example, the conditional information may include the first-type conditional information corresponding to the cell and the second-type conditional information corresponding to the beam. The configuration information may include that the priority of the first-type conditional information is higher than that of the second-type conditional information. In practice, if the multiple network devices satisfy the first-type conditional information and the second-type conditional information, the terminal selects the network device with the best communication quality in the cell from the multiple network devices as the target network device by comparing the first-type conditional information with higher priority.

As another example, the conditional information only includes one type of conditional information. For example, the conditional information includes the second-type conditional information corresponding to the beam, which includes the first threshold corresponding to the communication quality of the SSB and/or the CSI-RS, the second threshold corresponding to the number of the SSBs and/or the CSI-RSs, and the index information corresponding to the SSB and/or the CSI-RS. Then the configuration information may include the priorities of the above three kinds of second-type conditional information. For example, the priority of the index information corresponding to the SSB and/or the CSI-RS is greater than the priority of the second threshold corresponding to the number of the SSBs and/or the CSI-RSs and the priority of the first threshold corresponding to the communication quality of the SSB and/or the CSI-RS. In practice, if the multiple network devices satisfy the above second-type conditional information, for example, a base station 1, a base station 2 and a base station 3 all satisfy the first threshold corresponding to the communication quality of the SSB and/or the CSI-RS, the base station 2 satisfies the second threshold corresponding to the number of the SSBs and/or the CSI-RSs in the second-type conditional information, and the base station 3 satisfies the second threshold corresponding to the number of the SSBs and/or the CSI-RSs and the index information corresponding to the SSB and/or the CSI-RS, the base station 3 may be determined as the target network device according to the configuration information.

As another implementation mode, the number of pieces of conditional information satisfied by the target network device is greater than the number of pieces of conditional information satisfied by other network devices except the target network device in the multiple network devices.

In the present embodiment, the configuration information related to the conditional information is used to represent that number of pieces of the conditional information that are satisfied is maximum. As an example, if multiple network devices satisfy the above second-type conditional information, for example, the base station 1, the base station 2 and the base station 3 all satisfy the first threshold corresponding to the communication quality of the SSB and/or the CSI-RS in the second-type conditional information, the base station 1 and the base station 2 satisfy the second threshold corresponding to the number of the SSBs and/or the CSI-RSs in the second-type conditional information, and the base station 3 and the base station 1 satisfy the second threshold corresponding to the number of the SSBs and/or the CSI-RSs and the index information corresponding to the SSB and/or the CSI-RS in the second-type conditional information, the base station 1 may be determined as the target network device according to the configuration information.

In other implementation modes, the number of the determined target network devices may also be at least one.

Figure 3:
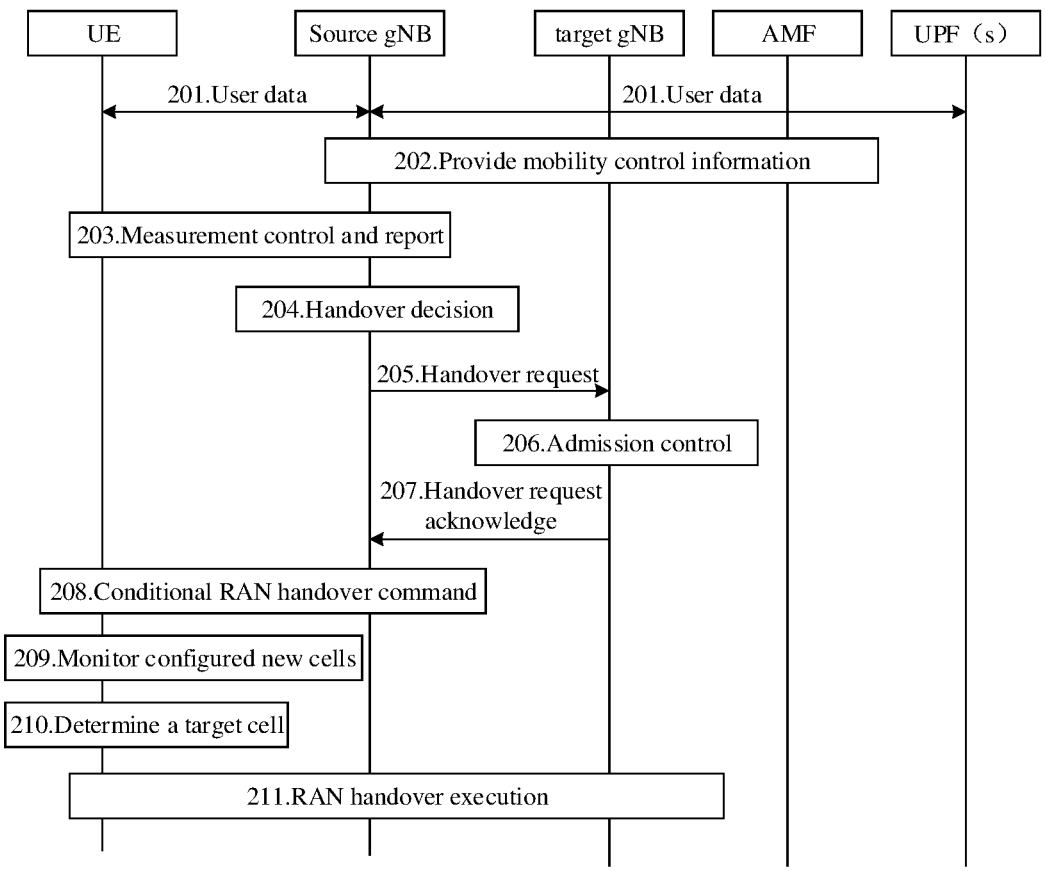
FIG. 3 is an interactive flowchart of a method for information processing according to an embodiment of the present disclosure.

Hereinafter, the method for information processing of the embodiment of the present disclosure will be described in detail with reference to specific examples and application scenarios. FIG. 3 is an interactive flowchart of a method for information processing according to an embodiment of the present disclosure. The example is described by taking an application scenario of conditional handover, a terminal as UE, a source network device as a source base station (gNB), and a target network device as a target base station (gNB). As shown in FIG. 3, the method may include the following operations.

At S201, User Data (UD) is exchanged between the UE and the source gNB, and between the source gNB and UPF.

At S202, the source gNB and AMF exchange mobility control information, and the mobility control information is provided by the AMF.

At S203, the source gNB sends measurement control information to the UE, and the source gNB acquires Measurement Control and Report from the UE.

At S204, the source gNB executes Handover Decision.

At S205, the source gNB sends a HANDOVER REQUEST to the target gNB.

At S206, the target gNB executes Admission Control.

At S207, the target gNB sends HANDOVER REQUEST ACKNOWLEDGE to the source gNB.

At S208, the source gNB sends a Radio Access Network (RAN) HO Command with conditions to the UE.

At S209, the UE monitors configured new cells.

At S210, the UE determines a target cell.

At S211, the UE and the target gNB conducts RAN Handover execution.

For S201 to S207 and S211 in the present embodiment, the current handover procedure may be referred to, and will not be described in detail here.

In S208 of the present embodiment, the RAN HO Command with conditions (hereinafter referred to as HO Command) sent by the source gNB to the UE may include conditional information for determining a target network device to be accessed. For the specific type and content of the conditional information, the foregoing embodiments may be referred to, and will not be described in detail here.

In S209 of the present embodiment, after receiving the HO Command, the UE monitors the communication quality (specifically, the channel quality) of the gNB.

In S210 of the present embodiment, the UE determines the target gNB based on the monitored information related to the communication quality in combination with the conditional information, which will be described with different examples below.

EXAMPLE 1

The conditional information in the present example may include first-type conditional information corresponding to a cell and second-type conditional information corresponding to a beam.

For the first-type conditional information, the channel quality of a target cell satisfies a third threshold corresponding to RSRP.

For the second-type conditional information, the quality of the beam in the target cell satisfies a first threshold corresponding to the RSRP.

If the monitoring result of the UE indicates that one base station satisfies the above conditional information, the base station is taken as a target base station.

If the monitoring result of the UE indicates that multiple base stations satisfy the above conditions, assuming that the priority of the first-type conditional information is higher than that of the second-type conditional information, the UE may determine the target base station based on the priority.

If the channel quality corresponding to the cell of the base station 1 is the best among the multiple base stations (for example, the RSRP value corresponding to the cell is the largest), the UE determines the base station 1 as the target base station and selects to access the base station 1.

It is assumed that the priority of the second-type conditional information is higher than that of the first-type conditional information.

Then, if the quality corresponding to the beam of the base station 2 is the best among the multiple base stations (for example, the RSRP value of the SSB and/or CSI-RS corresponding to the beam is the largest), the UE determines the base station 2 as the target base station and selects to access the base station 2.

EXAMPLE 2

The conditional information in the present example may include the first-type conditional information corresponding to the cell and the second-type conditional information corresponding to the beam.

For the first-type conditional information, the channel quality of a target cell satisfies a third threshold corresponding to the RSRP.

For the second-type conditional information, the quality of the beam in the target cell satisfies the first threshold corresponding to the RSRP, and the number of the beams satisfying the first threshold is greater than N, which is a positive integer.

If the monitoring result of the UE indicates that one base station satisfies the above conditional information, the base station is taken as a target base station.

If the monitoring result of the UE indicates that multiple base stations satisfy the above conditions, assuming that the priority of the first-type conditional information is higher than that of the second-type conditional information, if the channel quality corresponding to the cell of the base station 1 is the best among the multiple base stations (for example, the RSRP value corresponding to the cell is the largest), the UE determines the base station 1 as the target base station and selects to access the base station 1.

It is assumed that the priority of the second-type conditional information is higher than that of the first-type conditional information, and the priority of the condition of the first threshold corresponding to the communication quality of the SSB and/or the CSI-RS in the second-type conditional information is higher than that of the condition of the second threshold corresponding to the number of the SSBs and/or the CSI-RSs.

Then, if the quality of the beam corresponding to the base station 2 is the best among the multiple base stations (for example, the RSRP value of the SSB and/or the CSI-RS corresponding to the beam is the largest), the UE determines the base station 2 as the target base station and selects to access the base station 2.

It is assumed that the priority of the second-type conditional information is higher than that of the first-type conditional information, and the priority of the condition of the first threshold corresponding to the communication quality of the SSB and/or the CSI-RS in the second-type conditional information is lower than that of the condition of the second threshold corresponding to the number of the SSBs and/or the CSI-RSs.

Then, if the quality of the beam corresponding to the base station 3 satisfies the first threshold and the number of beams satisfying the first threshold is the largest, the UE determines the base station 3 as the target base station and selects to access the base station 3.

EXAMPLE 3

The conditional information in the present example may include the first-type conditional information corresponding to the cell and the second-type conditional information corresponding to the beam.

For the first-type conditional information, the channel quality of the target cell satisfies a third threshold corresponding to the RSRP.

For the second-type conditional information, the quality of the beam in the target cell satisfies the first threshold corresponding to the RSRP, and the beam satisfying the first threshold is configured with a CFRA resource.

If the monitoring result of the UE indicates that one base station satisfies the above conditional information, the base station is taken as the target base station.

If multiple base stations satisfy the configured condition, assuming that the priority of the first-type conditional information is higher than that of the second-type conditional information, if the channel quality corresponding to the cell of the base station 1 is the best among the multiple base stations (for example, the RSRP value corresponding to the cell is the largest), the UE determines the base station 1 as the target base station and selects to access the base station 1.

It is assumed that the priority of the second-type conditional information is higher than that of the first-type conditional information, and the priority of the condition of the first threshold corresponding to the communication quality of the SSB and/or the CSI-RS in the second-type conditional information is higher than that of the condition of the index information corresponding to the SSB and/or the CSI-RS.

Then, if the quality of the beam corresponding to the base station 2 is the best among the multiple base stations (for example, the RSRP value of the SSB and/or the CSI-RS corresponding to the beam is the largest), the UE determines the base station 2 as the target base station and selects to access the base station 2.

It is assumed that the priority of the second-type conditional information is higher than that of the first-type conditional information, and the priority of the condition of the first threshold corresponding to the communication quality of the SSB and/or the CSI-RS in the second-type conditional information is lower than that of the condition of the index information corresponding to the SSB and/or the CSI-RS.

Then, if the quality of the beam corresponding to the base station 3 satisfies the first threshold (for example, the RSRP of the SSB and/or the CSI-RS corresponding to the beam exceeds the first threshold) and the beam of the base station 3 is configured with the CFRA resource, the UE determines the base station 3 as the target base station and selects to access the base station 3.

If both the quality of the beam corresponding to the base station 3 and the quality of the beam corresponding to the base station 4 satisfy the first threshold (for example, the RSRP value of the SSB and/or the CSI-RS corresponding to the beam exceeds the first threshold) and both the beam of the base station 3 and the beam of the base station 4 are configured with the CFRA resource, assuming that the number of the beams satisfying the above condition of the base station 4 is greater than that of the beams satisfying the condition of the base station 3, the UE determines the base station 4 as the target base station and selects to access the base station 4.

According to the technical solutions of the embodiments of the present disclosure, the conditional information is sent to the terminal through the network device, and the conditional information is used for the terminal to determine the target network device to be accessed. The terminal acquires the conditional information, and the conditional information is used to determine the target network device to be accessed; and the target network device to be accessed is determined according to the conditional information. That is, a to-be-accessed target network device is judged through the conditional information. On one hand, the probability of successful handover is increased, and on the other hand, it may indicate whether the target network device is configured with a CFRA resource in the conditional information, so as to avoid the waste of the CFRA resource.

Figure 4:
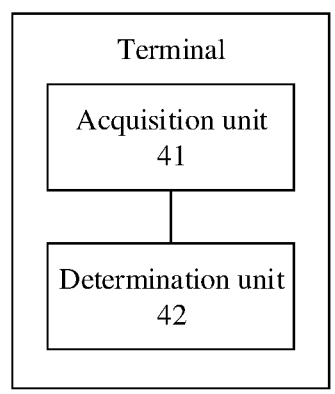
FIG. 4 is a schematic diagram of a structural composition of a terminal according to an embodiment of the present disclosure.

An embodiment of the present disclosure further provides a terminal. FIG. 4 is a schematic diagram of a structural composition of a terminal according to an embodiment of the present disclosure. As shown in FIG. 4, the terminal may include an acquisition unit 41 and a determination unit 42.

The acquisition unit 41 is configured to acquire conditional information, which is used to determine a target network device to be accessed.

The determination unit 42 is configured to determine the target network device to be accessed according to the conditional information.

In an alternative embodiment of the present disclosure, the conditional information may include conditional information related to communication quality.

In an alternative embodiment of the present disclosure, the conditional information may include first-type conditional information corresponding to a cell and/or second-type conditional information corresponding to a beam.

Alternatively, the second-type conditional information may include at least one of a first threshold corresponding to communication quality of SSB and/or CSI-RS, a second threshold corresponding to the number of the SSBs and/or the CSI-RSs, and index information corresponding to the SSB and/or the CSI-RS.

As an example, the number of the SSBs and/or the CSI-RSs represents the number of the SSBs and/or the CSI-RSs of which communication quality satisfies the first threshold.

As an example, the index information corresponding to the SSB and/or the CSI-RS represents that the communication quality of the SSB and/or the CSI-RS satisfies the first threshold, and the SSB and/or the CSI-RS is configured with a CFRA resource, which is used for CFRA.

In an alternative embodiment of the present disclosure, the communication quality is represented through at least one piece of information as follows: RSRP, RSRQ, and SINR.

In an alternative embodiment of the present disclosure, the acquisition unit 41 is configured to receive the conditional information configured by a network device.

In the present embodiment, the acquisition unit 41 is configured to receive the conditional information configured by a source network device. Alternately, the terminal receives the conditional information configured by a target network device. As an example, the source network device is a source base station; and the target network device is a target base station.

In an alternative embodiment of the present disclosure, the acquisition unit 41 is configured to receive a HO Command sent by the network device, and the HO Command includes the conditional information.

In an alternative embodiment of the present disclosure, the determination unit 42 is configured to determine one or more network devices according to the conditional information and determine the target network device from the one or more network devices.

As an implementation mode, the determination unit 42 is configured to determine first conditional information, the priority of the first conditional information being higher than that of other conditional information except the first conditional information in the conditional information; and determine the target network device from the multiple network devices based on the first conditional information.

As an implementation mode, the number of conditional information satisfied by the target network device is greater than the number of conditional information satisfied by other network devices except the target network device in the multiple network devices.

In the embodiment of the present disclosure, the determination unit 42 in the terminal may be implemented by a Central Processing Unit (CPU), a Digital Signal Processor (DSP), a Microcontroller Unit (MCU) or a Field-Programmable Gate Array (FPGA) in the terminal in practice. The acquisition unit 41 in the terminal may be implemented by a communication module (including: basic communication suites, operating systems, communication modules, standardized interfaces and protocols, etc.) and a transceiver antenna in practice.

It is to be noted that the network device provided by the above embodiment is only exemplified by the division of the above program modules when processing information. In practice, the above-mentioned processing distribution may be completed by different program modules as required, i.e., the internal structure of the network device is divided into different program modules to complete all or part of the above-described processing. In addition, the terminal provided by the above embodiment and the embodiment of the information processing method belong to the same concept, and the detailed implementation process thereof is detailed in the method embodiment and will be omitted herein.

Figure 5:
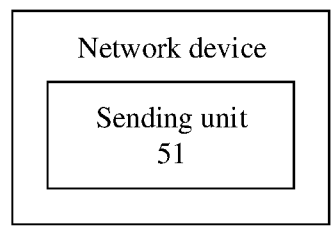
FIG. 5 is a schematic diagram of a structural composition of a network device according to an embodiment of the present disclosure.

An embodiment of the present disclosure further provides a network device. FIG. 5 is a schematic diagram of a structural composition of a network device according to an embodiment of the present disclosure. As shown in FIG. 5, the network device may include a sending unit, configured to send conditional information to a terminal. The conditional information is used to cause the terminal to determine a target network device to be accessed.

In an alternative embodiment of the present disclosure, the conditional information may include conditional information related to communication quality.

In an alternative embodiment of the present disclosure, the conditional information may include first-type conditional information corresponding to a cell and/or second-type conditional information corresponding to a beam.

Alternatively, the second-type conditional information may include at least one of a first threshold corresponding to the communication quality of SSB and/or CSI-RS, a second threshold corresponding to the number of the SSBs and/or the CSI-RSs, and index information corresponding to the SSB and/or the CSI-RS.

As an example, the number of the SSBs and/or CSI-RSs represents the number of the SSBs and/or the CSI-RSs whose communication quality satisfies the first threshold.

As an example, the index information corresponding to the SSB and/or the CSI-RS represents that the communication quality of the SSB and/or the CSI-RS satisfies the first threshold, and the SSB and/or the CSI-RS is configured with a CFRA resource, which is used for CFRA.

In an alternative embodiment of the present disclosure, the communication quality is represented through at least one piece of information as follows: RSRP, RSRQ, and SINR.

In an alternative embodiment of the present disclosure, the sending unit 51 is configured to send a HO Command to the terminal, and the HO Command includes the conditional information.

In the present embodiment, the network device is a source network device or a target network device corresponding to the terminal. As an example, the source network device is a source base station; and the target network device is a target base station.

In the embodiments of the present disclosure, the sending unit 51 in the network device may be implemented by a communication module (including: basic communication suites, operating systems, communication modules, standardized interfaces and protocols, etc.) and a transceiver antenna in practice.

It is to be noted that the network device provided by the above embodiment is only exemplified by the division of the above program modules when processing information. In practice, the above-mentioned processing distribution may be completed by different program modules as required, i.e., the internal structure of the network device is divided into different program modules to complete all or part of the above-described processing. In addition, the network device provided by the above embodiment and the embodiment of the information processing method belong to the same concept, and the detailed implementation process thereof is detailed in the method embodiment and will be omitted herein.

Figure 6:
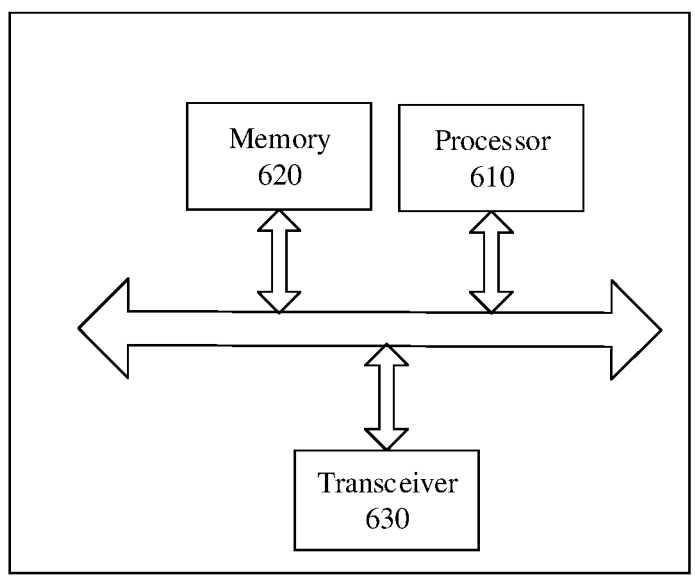
FIG. 6 is a structural schematic diagram of a communication device according to an embodiment of the present disclosure.

FIG. 6 is a structural schematic diagram of a communication device according to an embodiment of the present disclosure. The communication device may be a terminal or a network device, and as an example, the network device may be a base station. As shown in FIG. 6, the communication device may include a processor 610, and the processor 610 may call and run a computer program from a memory to implement the method in the embodiment of the present disclosure.

Alternatively, as shown in FIG. 6, the communication device may also include a memory 620. The processor 610 may call and run the computer program from the memory 620 to implement the method in the embodiment of the present disclosure.

The memory 620 may be a separate device independent of the processor 610 or integrated in the processor 610.

Alternatively, as shown in FIG. 6, the communication device may also include a transceiver 630, and the processor 610 may control the transceiver 630 to communicate with other devices. Specifically, it may send information or data to or receive information or data sent by other devices.

The transceiver 630 may include a transmitter and a receiver. The transceiver 630 may further include an antenna, and the number of antennas may be one or more.

Alternatively, the communication device may be the network device according to the embodiment of the present disclosure, and the processor of the network device is configured to call and run the computer program stored in the memory to execute the information processing method applied to the network device. For the sake of brevity, descriptions thereof are omitted herein.

Alternatively, the communication device may be the terminal according to the embodiment of the present disclosure, and the processor of the terminal is configured to call and run the computer program stored in the memory to execute the information processing method applied to the network device. For the sake of brevity, descriptions thereof are omitted herein.

Figure 7:
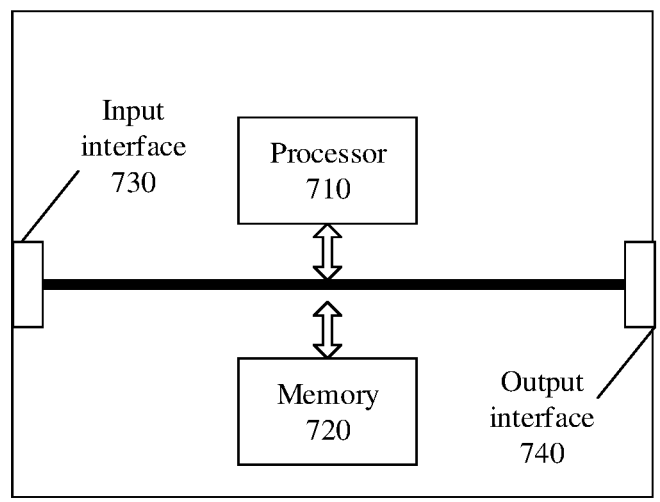
FIG. 7 is a structural schematic diagram of a chip according to an embodiment of the present disclosure.

FIG. 7 is a structural schematic diagram of a chip according to an embodiment of the present disclosure. As shown in FIG. 7, the chip may include a processor 710, and the processor 710 may call and run a computer program from a memory to implement the method in the embodiment of the present disclosure.

Alternatively, as shown in FIG. 7, the chip may also include a memory 720. The processor 710 may call and run the computer program from the memory 720 to implement the method in the embodiment of the present disclosure.

The memory 720 may be a separate device independent of the processor 710 or integrated in the processor 710.

Alternatively, the chip may also include an input interface 730. The processor 710 may control the input interface 730 to communicate with other devices or chips, and specifically, may acquire information or data sent by other devices or chips.

Alternatively, the chip may also include an output interface 740. Alternatively, the processor 710 may control the output interface 740 to communicate with other devices or chips, and specifically, may output information or data to other devices or chips.

Alternatively, the chip may be applied to the network device according to the embodiment of the present disclosure, so that the network device installed with the chip may execute the information processing method applied to the network device. For the sake of brevity, descriptions thereof are omitted herein.

Alternatively, the chip may be applied to the terminal according to the embodiment of the present disclosure, so that the device installed with the chip may execute the information processing method applied to the network device. For the sake of brevity, descriptions thereof are omitted herein.

It is to be understood that the chip mentioned in the embodiment of the disclosure may also be called a system-level chip, a system chip, a chip system, a system on chip, or the like.

It is to be understood that the processor in the embodiment of the disclosure may be an integrated circuit chip and has a signal processing capacity. In an implementation process, each step of the method embodiments may be completed by an integrated logical circuit of hardware in the processor or an instruction in a software form. The processor may be a general-purpose processor, a Digital Signal Processor (DSP), an Application Specific Integrated Circuit (ASIC), a Field Programmable Gate Array (FPGA) or another programmable logic device, a discrete gate or transistor logic device, and a discrete hardware component. Each method, step, and logical block diagram disclosed in the embodiment of the disclosure may be implemented or executed. The general-purpose processor may be a microprocessor, or the processor may be any conventional processor, etc. The steps of the method disclosed in combination with the embodiment of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM), and a register. The storage medium is in a memory. The processor reads information in the memory and completes the steps of the method in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM, or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be noted that the memory of a system and method described in the disclosure is intended to include, but is not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM, and a DR RAM. That is, the memory in the embodiments of the disclosure is intended to include, but is not limited to, memories of these and any other proper types.

An embodiment of the present disclosure further provides a communication system. The communication system may include a terminal and a network device. The terminal may be configured to implement the corresponding functions implemented by the terminal in the above method, and the network device may be configured to implement the corresponding functions implemented by the network device in the above method. For simplicity, elaborations are omitted herein.

An embodiment of the disclosure also provides a computer-readable storage medium, which is configured to store a computer program. The computer program enables a computer to execute corresponding flows in the method applied to any of the terminal or the network device of the embodiments of the disclosure. For simplicity, elaborations are omitted herein.

An embodiment of the disclosure also provides a computer program product, which may include a computer program instruction. The computer program instruction enables a computer to execute corresponding flows in the method applied to any of the terminal or the network device of the embodiments of the disclosure. For simplicity, elaborations are omitted herein.

An embodiment of the disclosure also provides a computer program. The computer program enables a computer to execute corresponding flows in the method applied to any of the terminal or the network device of the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed by hardware or software depends on specific applications and design constraints of the technical solutions. Professionals may realize the described functions for each specific application by use of different methods, but such realization shall fall within the scope of the disclosure.

Those skilled in the art may clearly learn about that specific working processes of the system, device, and unit described above may refer to the corresponding processes in the method embodiment and will not be elaborated herein for ease and briefness of description.

In some embodiments provided by the disclosure, it is to be understood that the disclosed system, device, and method may be implemented in another manner. For example, the device embodiment described above is only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, namely they may be located in the same place, or may be distributed to multiple network units. Part or all of the units may be selected to achieve the purposes of the solutions of the embodiments according to a practical requirement.

In addition, each function unit in each embodiment of the disclosure may be integrated into a processing unit, or each unit may exist independently, or two or more than two units may also be integrated into a unit.

When realized in form of software function unit and sold or used as an independent product, the function may be stored in a computer-readable storage medium. Based on such an understanding, the technical solutions of the disclosure substantially or parts making contributions to the conventional art or part of the technical solutions may be embodied in form of software product. The computer software product is stored in a storage medium, including a plurality of instructions configured to enable a computer device (which may be a personal computer, a server, a network device, etc.) to execute all or part of the steps of the method in each embodiment of the disclosure. The above-mentioned storage medium includes: various media capable of storing program codes such as a U disk, a mobile hard disk, a ROM, a RAM, a magnetic disk, or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for information processing, comprising:
    acquiring, by a terminal, conditional information, the conditional information being used for determining a target network device to be accessed; and
    determining, by the terminal, the target network device to be accessed according to the conditional information;
    wherein the conditional information comprises second-type conditional information, the second-type conditional information comprises index information corresponding to a Synchronization Signal Block (SSB) and/or Channel Status Indicator Reference Signal (CSI-RS), and
    the index information corresponding to the SSB and/or CSI-RS represents that a communication quality of the SSB and/or CSI-RS satisfies a first threshold corresponding to communication quality of the SSB and/or CSI-RS, and the SSB and/or CSI-RS is configured with a Contention-Free Random Access (CFRA) resource, the CFRA resource being used for CFRA.

2. The method of claim 1, wherein the conditional information comprises conditional information related to communication quality.

3. The method of claim 1, wherein the conditional information further comprises: first-type conditional information corresponding to a cell.

4. The method of claim 3, wherein the second-type conditional information further comprises at least one of the following:
    the first threshold corresponding to communication quality of the SSB and/or CSI-RS; or
    a second threshold corresponding to a number of SSBs and/or CSI-RSs.

5. The method of claim 4, wherein the number of SSBs and/or CSI-RSs represents the number of SSBs and/or CSI-RSs of which communication quality satisfies the first threshold.

6. A terminal, comprising:
    a transceiver, configured to acquire conditional information, the conditional information being used for determining a target network device to be accessed; and
    a processor, configured to determine the target network device to be accessed according to the conditional information;
    wherein the conditional information comprises second-type conditional information, the second-type conditional information comprises index information corresponding to a Synchronization Signal Block (SSB) and/or Channel Status Indicator Reference Signal (CSI-RS), and the index information corresponding to the SSB and/or CSI-RS represents that a communication quality of the SSB and/or CSI-RS satisfies a first threshold corresponding to communication quality of the SSB and/or CSI-RS, and the SSB and/or CSI-RS is configured with a Contention-Free Random Access (CFRA) resource, the CFRA resource being used for CFRA.

7. The terminal of claim 6, wherein the conditional information comprises conditional information related to communication quality.

8. The terminal of claim 6, wherein the conditional information further comprises first-type conditional information corresponding to a cell.

9. The terminal of claim 8, wherein the second-type conditional information further comprises at least one of:
the first threshold corresponding to communication quality of the SSB and/or CSI-RS; or
a second threshold corresponding to a number of SSBs and/or CSI-RSs.

10. The terminal of claim 9, wherein the number of SSBs and/or CSI-RSs represents the number of SSBs and/or CSI-RSs of which communication quality satisfies the first threshold.

11. The terminal of claim 6, wherein the communication quality is represented by at least one of the following information: Reference Signal Received Power (RSRP), Reference Signal Received Quality (RSRQ), or Signal to Interference plus Noise Ratio (SINR).

12. The terminal of claim 6, wherein the transceiver is configured to receive the conditional information configured by a network device.

13. The terminal according to claim 12, wherein the transceiver is configured to receive the conditional information configured by a source network device, or receive the conditional information configured by a target network device.

14. The terminal according to claim 12, wherein the transceiver is configured to receive a handover command sent by the network device, the handover command comprising the conditional information.

15. A network device, comprising a transceiver, configured to send conditional information to a terminal, wherein the conditional information is used for the terminal to determine a target network device to be accessed;
wherein the conditional information comprises second-type conditional information, the second-type conditional information comprises index information corresponding to a Synchronization Signal Block (SSB) and/or Channel Status Indicator Reference Signal (CSI-RS), and
the index information corresponding to the SSB and/or CSI-RS represents that a communication quality of the SSB and/or CSI-RS satisfies a first threshold corresponding to communication quality of the SSB and/or CSI-RS, and the SSB and/or CSI-RS is configured with a Contention-Free Random Access (CFRA) resource, the CFRA resource being used for CFRA.

16. The network device of claim 15, wherein the conditional information comprises conditional information related to communication quality.

17. The network device of claim 15, wherein the conditional information further comprises at least one of first-type conditional information corresponding to a cell.

18. The network device of claim 17, wherein the second-type conditional information further comprises at least one of:
the first threshold corresponding to the communication quality of the SSB and/or CSI-RS;
a second threshold corresponding to the number of the SSBs and/or CSI-RSs.

19. The network device of claim 18, wherein the number of the SSBs and/or CSI-RSs represents the number of the SSBs and/or CSI-RSs of which communication quality satisfies the first threshold.

* * * * *